United States Patent [19]

Ballato, Jr.

[11] Patent Number: 4,487,727
[45] Date of Patent: Dec. 11, 1984

[54] PACKING MATERIAL FOR CONTACTING TOWERS

[76] Inventor: Joseph F. Ballato, Jr., 23 Orchard St., Mt. Vernon, N.Y. 10552

[21] Appl. No.: 264,975

[22] Filed: May 18, 1981

[51] Int. Cl.³ .............................................. B01F 3/04
[52] U.S. Cl. .............................. 261/94; 261/DIG. 72
[58] Field of Search .......................... 261/DIG. 72, 94

[56]  References Cited
U.S. PATENT DOCUMENTS

| | | | |
|---|---|---|---|
| 96,842 | 11/1869 | Shaler | 261/DIG. 72 |
| 1,365,671 | 1/1921 | Fairlie | |
| 2,227,164 | 12/1940 | Stedman | |
| 2,594,585 | 4/1952 | Ridgway, Jr. | 261/DIG. 72 |
| 2,911,204 | 11/1959 | Malone | 261/DIG. 72 |
| 3,293,174 | 12/1966 | Robjohns | 261/DIG. 72 |
| 3,364,656 | 1/1968 | Whiton et al. | |
| 3,410,057 | 11/1968 | Lerner | 261/DIG. 72 |
| 3,502,596 | 3/1970 | Sowards | 261/DIG. 72 |
| 4,005,010 | 1/1977 | Lunt | 261/DIG. 72 |
| 4,122,011 | 10/1978 | Strigle, Jr. | |
| 4,324,749 | 4/1982 | Bronner | 261/DIG. 72 |

OTHER PUBLICATIONS

Circular "Useful Tips for Packing a Tower" Intalox Brochure.

Primary Examiner—Tim Miles
Attorney, Agent, or Firm—Brumbaugh, Graves Donohue & Raymond

[57] ABSTRACT

A system for promoting fluid mixing in a packed tower or the like includes a plurality of polyhedral, fluid permeable cells. The cells contain a fibrous packing material with a substantial surface area for mixing the fluids. The cells are so adapted as to be immediately disposed in interlocking relationship in the tower to prevent the fluids from flowing in channels in the tower. In a preferred embodiment, each cell has twelve corners.

15 Claims, 5 Drawing Figures

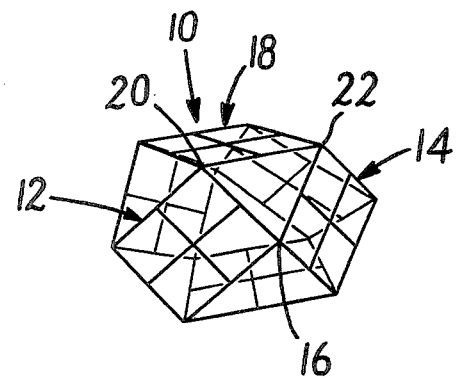
FIG. 1
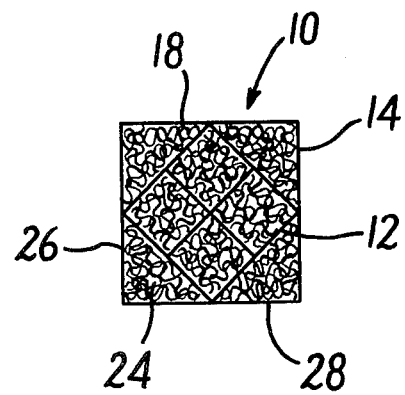
FIG. 2
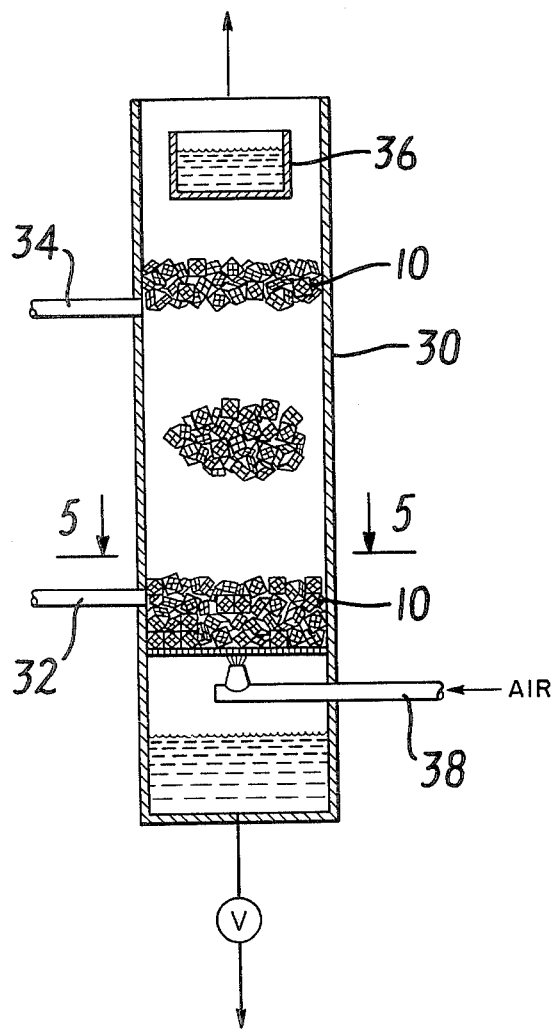
FIG. 3
24 ⌇⌇⌇⌇⌇⌇⌇⌇⌇⌇⌇
FIG. 4
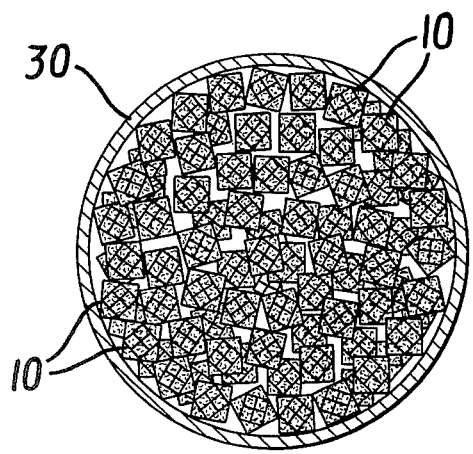
FIG. 5

PACKING MATERIAL FOR CONTACTING TOWERS

BACKGROUND OF THE INVENTION

This invention relates to packing materials, and more particularly, to packing cells positioned in a packed tower for promoting gas-liquid and liquid-liquid contact.

Gas-liquid and liquid-liquid mixing towers are used in industrial processes for a variety of purposes. In an absorption or scrubbing operation, for example, one or more constituents of a mixture of gases is removed by contacting the mixture in a tower with a liquid capable of dissolving the gases. In a stripping operation, a dissolved component is removed from a liquid stream by volatilization into a gas stream injected in a tower. Distillation of multicomponent feeds also transpires in a contacting tower.

In contacting towers, various means are used to promote contact between the components being mixed. One such means is a bubble-cap plate, which is a horizontal deck with a large number of chimneys over which circular or rectangular caps are mounted to channel and distribute gas through the liquid. Liquid flows by gravity downward from plate to plate through separate passages, called downcomers. Each bubble-cap plate must be custom made for each installation, however, increasing the cost of such plates. Channeling is frequently a problem with bubble-cap plates since the liquid flows through the channels formed by the downcomers. Since large flat areas are positioned in the path of the moving fluids, a large pressure drop occurs, resulting in significant energy losses and inefficiency in operation.

A sieve plate can also be positioned in a tower to promote gas and liquid contact. A sieve plate is a horizontal deck with several round holes for mixing the gas and the liquid. Sieve plates have several drawbacks, however. They have a restricted operating range since the plates "flood", i.e., the amount of liquid flowing into the tower exceeds the amount which can flow through the sieve plates. Sieve plates also "weep" relatively easily, i.e., the liquid in a gas-liquid mixture flows downwardly through the holes in the plates. Each sieve plate must be made for a specific installation; hence, standardization in manufacturing is not generally feasible. Sieve plates, like bubble-cap plates, produce significant pressure drops in the fluids flowing through the mixing tower, because they have large, flat surface areas disposed in a rapidly flowing fluid stream. Another drawback of sieve plates is that they can easily clog and corrode, depending on the composition, and then must be either replaced or cleaned, thus increasing the costs associated with their use. Non-corroding materials for sieve plates are often quite expensive.

Packed columns have also been developed to promote fluid contact. A packed column has a succession of beds made up of several small solid shapes through which the fluids flow in tortuous countercurrent paths. The packing materials assume various shapes to promote mixing. These shapes have recognized names, such as Raschig rings, Lessing rings, Berl saddles, Prym partition rings, and double-turn spirals. Polyhedral cubes have been suggested for forming a bed in a packed tower. These polyhedral structures must be carefully placed in the tower in an interlocking relationship to mix the fluids; otherwise, the liquids tend to flow in channels through the tower, thereby preventing good mixing. Spheres have also been suggested to overcome the problems relating to the orientation of the packing materials. The spheres must be individually prepared for each installation, and standardization in manufacture is difficult. Hollow perforated spheres have also been suggested, but, again, the surface area for fluid contact cannot be easily modified. And, significant pressure drops are likely in prior arrangements.

Accordingly, a need thus exists for novel packing cells which cooperate in interlocking relationship to prevent channeling in a packed mixing tower. Packing cells which induce a minimal pressure drop are needed as well. A need also exists for a packing cell whose surface area can be easily altered to accommodate different fluid mixing conditions, permitting standardization in manufacture and hence, reducing costs.

SUMMARY OF THE INVENTION

In accord with the present invention, packing cells meeting many of the deficiencies of the above systems are provided. A number of polyhedral cells are positioned in a mixing tower to promote gas-liquid and liquid-liquid contact. The cells are gas and liquid permeable and have a substantial surface area for mixing the gas with the liquid. The cells are so adapted as to be immediately disposed in interlocking relationship upon settlement in the packed bed to prevent the fluids from flowing in channels in the tower.

Each cell positioned in the tower is a polyhedron with a plurality of permeable faces, preferably made of inexpensive mesh of suitable material, and open areas defined by the sides of these adjacent faces. Each cell is made in a standardized shape and size, permitting significant reductions in manufacturing cost. The construction materials are readily available, at low cost, further adding to their desirability. Significantly, each face has a polygonal shape and is connected at each corner with only one adjacent face. Fibrous packing is disposed in each polyhedral cell to provide increased surface area for the fluid contact. The packing can be made of synthetic fibers which do not corrode and easily clog. The numerous small strands of the fibrous material provide an increased "wettability" factor for a cell constructed in accord with the present invention. The amount of fibers positioned in each cell can easily be changed to suit the conditions present in each application.

Each cell preferably has six polygonal faces, with each face joined to each adjacent face at only one corner. This arrangement provides gaps at each corner of the cell permitting several cells to fit closely together and inhibiting undesirable channeling of the liquid flow. By eliminating large flat surfaces, the pressure drop through the tower is significantly reduced, adding to the energy efficiency of the system. In addition, improved heat transfer characteristics over prior devices are effected through the distribution of the cells in the packed tower, large surface area, the improved intimate contacting of the fluids and the higher occurrence of turbulent films.

BRIEF DESCRIPTION OF THE DRAWINGS

A more complete understanding of the invention and its advantages will be apparent from the following Detailed Description taken in conjunction with the accompanying drawings in which:

FIG. 1 is a perspective view of one embodiment of a cell according to the present invention, with fibrous packing material disposed inside;

FIG. 2 is an end view of a cell showing one embodiment of a face of the cell;

FIG. 3 is a schematic diagram of a gas-liquid mixing tower with a multiplicity of cells disposed therein;

FIG. 4 is an illustration of fibrous packing material which can be disposed inside a cell; and FIG. 5 shows an interlocking relationship of an embodiment of the cells of the present invention.

DETAILED DESCRIPTION

The cell 10 of FIG. 1 has a plurality of faces 12 made of wire mesh. In the illustrated embodiment, each face 12 preferably comprises six strands of wire. Each face 12 has a diamond or parallelogram shape, and is connected to each adjacent face at only one point. In the illustrated embodiment, face 12 is connected to face 14 at point 16, and to face 18 at point 20. Faces 14 and 18 are connected at point 22.

The interconnecting relationship between the faces 12, 14, 18 of the cell 10 form a significant aspect of the present invention. Since the faces are not positioned whereby an entire edge of a face coincides with an edge of an adjacent face, gaps or spaces are formed in the cell 10. When a plurality of cells 10 are positioned in a layer, the gaps or spaces formed about the corners aid in establishing a random, yet interlocking, relationship among the cells 10.

In the illustrated embodiment, the cell 10 has twelve corners, unlike the usual cube, which has eight corners. The multi-cornered shape of the cell 10 provides the interlocking relationship between the cells 10 when a plurality of cells 10 are randomly positioned in a packed bed in a mixing tower.

As will be recognized by those of skill in the art, the preferred parallelogram or diamond shape of each face 12, 14, 18 of the cell 10 can be changed to another suitable shape, such as a hexagon or an octagon, without departing from the spirit and scope of the invention. Other gauge mesh can be substituted for the six-strand mesh, as the conditions require.

A fibrous material 24 is disposed within the cell 10. Referring momentarily to FIG. 4 in conjunction with FIG. 2, the fibrous material 24 is, in the preferred embodiment, a polytetrafluoroethylene fiber of variable length. Other materials for the fiber are, for example, carbon steel, stainless steel, and monel. The fiber is a loose weave, flat, material which offers a substantial surface area for promoting contact between the fluids flowing in the tower. The amount and relative permeability of the fibrous material 24 can be varied according to the process requirements and the surface area provided by each cell 10 may be altered as required and, thereby, the characteristics of the cell 10. The fibrous material 24 and its disposal in a cell 10 form a significant aspect of the present invention because this arrangement permits each cell 10 to be altered to suit the process needs of a tower without reconstructing or redesigning the entire cell 10, as in the prior art. The arrangement also permits standardization in the manufacture of the cells 10, since one size cell need be made for many applications. In a preferred embodiment, each cell 10 may be one inch in dimension and so filled as to compare with a commercially available 3-inch cell and, as such, to provide greatly improved gas-liquid and liquid-liquid contacting while reducing channeling.

In FIG. 2, the basic cubic configuration of the cell 10 is more clearly illustrated. The face 12 is joined to its adjacent faces 14, 18, 26, 28 at only one corner. This arrangement for connecting the faces of the cell 10 produce a cell 10 having a polyhedral shape whereby it interlocks with a plurality of other cells 10.

In the embodiment of FIG. 3, a plurality of cells 10 are disposed in a tower 30 to form a bed adjacent a lower pressure tap 32 disposed in the lower portion of the bed of cells 10. An upper pressure tap 34 is also provided near the top of the bed. Liquid, for example water, is supplied to the tower 30 from a liquid distributor 36. Air or other suitable gas is injected into the tower 30 from a distribution 38 located below the bed of cells 10.

The cells 10 are positioned randomly in a bed in the tower 30. The water or other liquid is released into the tower 30 and the gas contacts the liquid in the cells 10. As will be evident to those of skill in the art, numerous other arrangements of cells 10 in beds are possible, according to the performance requirements of each tower 30.

In FIG. 5, it is seen that the cells 10 are positioned randomly in interlocking relationship to promote gas-liquid and liquid-liquid contact yet prevent channeling of the liquid and gas flowing through the bed. The cells 10 are positioned in close proximity with each other and do not form significant gaps therebetween, as in prior art packing materials.

In operation, a $5\frac{3}{4}$ inch inside diameter plexiglas tower contained a bed of cells 10 to a depth of 8 inches. A pressure tap was placed $1\frac{1}{4}$ inches from the top of the bed and a second was positioned 5 inches below the first. Each cell was formed of a $\frac{1}{2}$ inch wire mesh on a square pitch. Liquid was introduced countercurrently with respect to the air from an overhead distributor. A quantity of liquid was maintained in the tower at the bottom as a hydrostatic seal. The packing factor for the run is a dimensionless number and is a function of the effective percent free space, and the effective surface area provided by the packing according to the formula:

$$\left( \frac{28.6\,V}{\sqrt{\rho_L/\rho_G}} \sqrt{\frac{a}{F^3} \mu_L^{0.2}} \right)^{\frac{1}{2}} + \left( \frac{Q}{7.481} \sqrt{\frac{a}{F^3} \mu_L^{0.2}} \right)^{\frac{1}{2}} = 18.91$$

wherein V (flooding gas rate, GPM per square foot of tower cross section) equals 0.0, Q is the flooding liquid ratio in GPM per square foot of tower cross sections, $a/F^3$ is the packing factor, and $\mu_L$ is the liquid viscosity (cp). The first term is zero, so the packing factor can be determined from the second term. In the following table, the pressure drop for 5 inches of packing was measured by a manometer in inches of water, and converted to pressure drop in inches of water per foot of packing. The results of the run are listed below in Table 1.

TABLE I

| 10.2 gal/min. flow rate | | 16.2 gal/min. flow rate | |
|---|---|---|---|
| CFM | Δp in inches of water/ft of packing | CFM | Δp in inches of water/ft of packing |
| 0.0 | — | 0.0 | — |
| 5.0 | — | 5.0 | 0.024 |
| 10.0 | — | 10.0 | 0.048 |
| 15.0 | — | 15.0 | 1.632 |
| 20.0 | 0.72 | 13.0 | 1.440 |
| 25.0 | 1.68 | 11.5 | 1.340 |
| **30.0 | 2.64 | 15.0 | 1.580 |
| **28.0 | 2.40 | **16.0 | 1.700 |
| *26.0 | 2.16 | | |
| 23.0 | 1.68 | | |
| 21.0 | 1.20 | | |
| 25.0 | 0.48 | | |
| 25.0 | 1.44 | | |
| 22.5 | 1.48 | | |
| 27.5 | 1.94 | | |

Temperature: 70° F.
Pressure: 14.7 psia
Packing factor: 70
**Tower Fully Flooded
*Tower Half Flooded With a flow rate of 10.2 gal/min, the tower was fully flooded at 28 and 30 CFM in the experimental results reported in Table I. The tower was half-flooded at 26 CFM. It can be concluded that the flow rates associated with the flooding condition are approximately 28 CFM of air and 10.2 GPM for the selected packing. The pressure drop at flooding was approximately 2.4 inches of water per foot of packing. With a flow rate of 16.2 gal/min, flooding was observed at 16 CFM, with a pressure drop of 1.7 inches of water per foot of packing.

A second run was performed with two types of packing positioned in a 2¾ inch inside diameter plexiglas column and packed to a depth of 14 inches. Five trials were made with each type of packing. In Table II, Packing Type 1 had twice the amount of internal packing as Type 2. The air flow rate was set to 0 while the liquid rate was varied for each run.

TABLE II

| Trial | Gal/min | Packing Factor |
|---|---|---|
| | Packing Type 1 | |
| 1 | 19.0 | 47.6 |
| 2 | 17.0 | 59.4 |
| 3 | 16.5 | 63.1 |
| 4 | 17.5 | 56.1 |
| 5 | 17.0 | 59.4 |
| | Packing Type 2 | |
| 1 | 28.0 | 21.9 |
| 2 | 28.0 | 21.9 |
| 3 | 27.5 | 22.7 |
| 4 | 28.6 | 21.0 |
| 5 | 28.2 | 21.6 |

Temperature: 70° F.
Pressure: 14.7 psia
Gas flow rate: 0.0 Cubic feet/min.

From Table II, it can be concluded that the characteristics of the packing can be varied by varying the amounts of the internal material.

A third run was made to obtain more accurate pressure drop and capacity data. A 21-inch bed of packing material was loaded into a 5¾ inch inside diameter plexiglas tower. Pressure taps were placed in the beds 12 inches apart. Two trials were made between the indicated liquid rates and air rates of Table III.

TABLE III

| 13.28 gal/min. | | 9.82 gal/min. | |
|---|---|---|---|
| CFM | p″ water/ft of packing | CFM | p″ water/ft of packing |
| 0.0 | — | 0.0 | — |
| 5.0 | 0.40 | 5.0 | 0.50 |
| 10.0 | 0.45 | 10.0 | 0.50 |
| 15.0 | 0.50 | 15.0 | 0.50 |
| 20.0 | 0.55 | 20.0 | 0.58 |
| 25.0 | 0.63 | 21.0 | 0.58 |
| 26.0 | 0.65 | 22.0 | 0.58 |
| 27.0 | 0.70 | 23.0 | 0.60 |
| *28.0 | 0.76 | 30.0 | 0.80 |
| **29.0 | 1.20 | 31.0 | 0.85 |
| **30.0 | 1.20 | 32.0 | 0.85 |
| **31.0 | 1.25 | *33.0 | 0.90 |
| **30.0 | 1.30 | **34.0 | 0.95 |
| *29.0 | 0.78 | **35.0 | 1.00 |
| *28.0 | 0.78 | **40.0 | 2.40 |
| *27.0 | 0.70 | **36.0 | 1.10 |
| 26.0 | 0.65 | **37.0 | 1.25 |
| 25.0 | 0.63 | **38.0 | 1.80 |
| 24.0 | 0.62 | **39.0 | 2.60 |
| | | **40.0 | 2.40 |
| | | **35.0 | 1.00 |

Temperature: 70° F.
Pressure: 14.7 psia
Packing factor: 70
*Tower Near Flooding
**Tower Fully Flooded
Packing Type: 1

Flooding occurred between 29 and 31 CFM, with the tower nearly flooding at 27-28 CFM, with the flow rate of 13.28 gal./min. With a flow rate of 9.82 gal./min., flooding occurred at 33.0 CFM and above at a liquid flow rate of 9.82 gal/min. From the third experiment, it can be more accurately concluded that the pressure drop at flooding is approximately 0.7 to 0.9 inches of water per foot of packing. Channeling was not observed during testing. Intimate liquid and gas contacting was promoted by the interaction of each cell through its configuration, with the gas and liquid flowing in tortuous, countercurrent paths.

In a fourth experiment, air containing small amounts of sulfur dioxide was introduced into a tower to compare the mass-transfer characteristics of cells constructed in accord with the present invention with that of Glitsch Ballast Rings and Ballast Saddles. Significantly greater amounts of the sulfur dioxide were "scrubbed" or removed from the air with the cells of the present invention than with the commercially available units.

While more than one embodiment of the present invention has been disclosed in detail herein and described in the accompanying drawings, various further modifications may be made without departing from the spirit and scope of the invention.

What I claim is:
1. A system for promoting the mixing of fluids in a packed tower or the like comprising:
   a plurality of polyhedral, fluid permeable cells having a substantial surface area for mixing said fluids in tortuous, countercurrent paths; and
   said cells being disposed in interlocking relationship in said tower to prevent said fluids from flowing in channels in said tower, wherein each of said cells comprises a cube-like structure with six faces, each of said faces having a polygonal shape with corners and connected by only one corner to each adjacent face.

2. The system of claim 1 and further comprising packing disposed in said cells and providing substantial surface area for said system.

3. The system of claim 2 wherein said packing comprises fibrous material.

4. The system of claim 1 wherein each of said faces comprises a mesh with at least six strands.

5. The system of claim 1 wherein said faces of said cube have at least twelve points of contact.

6. The system of claim 1 wherein said cells have at least twelve corners.

7. A cell for positioning in a packed tower or the like and for promoting fluid mixing therein comprising:
   a polyhedron with a plurality of fluid permeable faces, each of said faces having a polygonal shape with corners and being connected by only one corner to each adjacent face; and
   packing disposed in said polyhedron with a large surface area providing tortuous, countercurrent paths for said fluid mixing.

8. The cell of claim 7 wherein said polyhedron comprises a cube-like structure with six faces.

9. The cell of claim 7 wherein said packing comprises fibrous material.

10. The cell of claim 9 wherein said fibrous material is selected from the group consisting of polytetrafluoroethylene, carbon steel, stainless steel and monel.

11. The cell of claim 7 wherein each said face comprises wire mesh.

12. The cell of claim 11 wherein each wire mesh face has at least six strands.

13. The cell of claim 8 wherein each face of said cube-like structure comprises a square shape.

14. The cell of claim 8 wherein said cube-like structure has 12 corners.

15. A packing cell for positioning in a packed tower or the like and for promoting fluid mixing therein comprising:
   a polyhedron with six faces, each face having a square shape and formed of mesh whereby said fluids freely flow therethrough, each face connected at only one corner to each adjacent face to form gaps in said polyhedron; and
   fibers disposed in said polyhedron to increase the surface area of said cell and provide tortuous, countercurrent paths for said fluids.

* * * * *